United States Patent [19]
Hofmann

[11] Patent Number: 5,073,775
[45] Date of Patent: Dec. 17, 1991

[54] BROADBAND SIGNAL SWITCHING EQUIPMENT

[75] Inventor: Ruediger Hofmann, Gilching, Fed. Rep. of Germany

[73] Assignee: Siemens Aktiengesellschaft, Munich, Fed. Rep. of Germany

[21] Appl. No.: 678,034

[22] Filed: Apr. 1, 1991

[30] Foreign Application Priority Data

Apr. 12, 1990 [EP] European Pat. Off. ........... 90107016

[51] Int. Cl.$^5$ .............................................. H04B 3/00
[52] U.S. Cl. ............................ 340/825.79; 340/825.91
[58] Field of Search .................... 340/825.79, 825.85, 340/825.89, 825.9, 825.91; 307/239, 241, 571, 279; 379/291, 292

[56] References Cited

U.S. PATENT DOCUMENTS

| | | | |
|---|---|---|---|
| 4,004,284 | 1/1977 | Heeren | 307/279 |
| 4,897,645 | 1/1990 | Hofmann | 340/825.91 |
| 4,949,086 | 8/1990 | Hofmann | 340/825.91 |
| 4,998,101 | 3/1991 | Trumpp et al. | 340/825.91 |

FOREIGN PATENT DOCUMENTS 0219848 4/1987 European Pat. Off. .
0345623 12/1989 European Pat. Off. .

OTHER PUBLICATIONS

Shin et al., "A 250-Bit/s CMOS Crosspoint Switch", IEEE Journal of Solid-State Circuits, vol. 24, No. 2, 1989, pp. 478–486.

Primary Examiner—Donald J. Yusko
Assistant Examiner—Dervis Magistre
Attorney, Agent, or Firm—Hill, Van Santen, Steadman & Simpson

[57] ABSTRACT

A crosspoint matrix has matrix input lines which lead via pairs of switching elements to matrix output lines having, respectively, two signal conductors which are respectively connectible to a reference potential source via a precharging transistor controlled by a precharging clock and which have signal inputs of differential amplifier with a trigger behavior connectible thereto. The pair of switching elements respectively comprise two input transistors that have their control electrodes connected to a signal conductor of the appertaining matrix input line and form a series circuit with a respective switching transistor leading to the one or, respectively, other output signal conductor, a logic element that is respectively oppositely controlled by the precharging clock is inserted into the input lines and, in the switching elements, the ends of the series circuits facing away from the matrix output line are directly connected to the appertaining terminal of the operating voltage source.

18 Claims, 4 Drawing Sheets

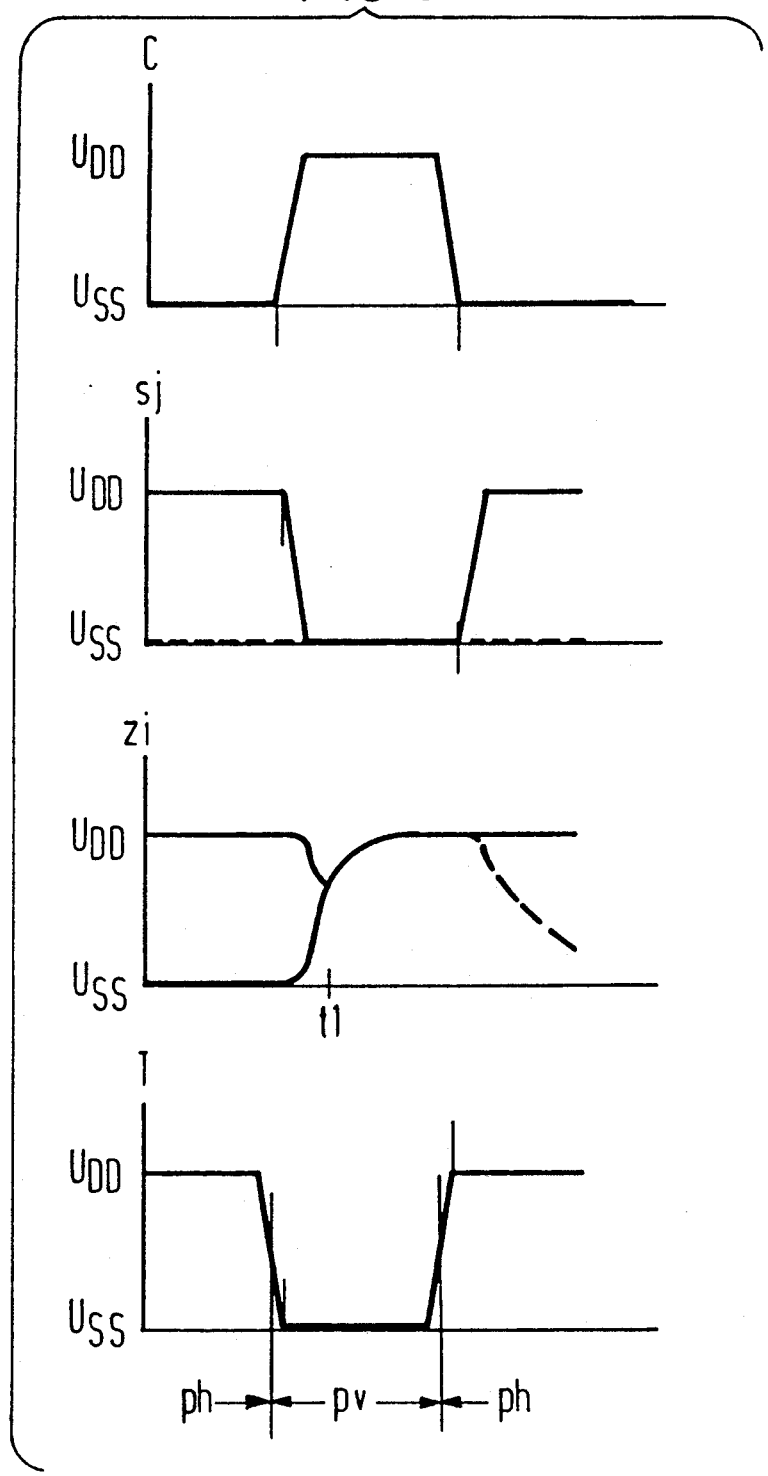

BROADBAND SIGNAL SWITCHING EQUIPMENT

BACKGROUND OF THE INVENTION

1. Field of the Invention:

The present invention relates to broadband signal switching equipment, and more particularly to such equipment comprising a crosspoint matrix constructed in field-effect transistor (FET) technology having matrix input lines which are connectible via crosspoints respectively formed with pairs of switching elements to matrix output lines respectively formed with two signal conductors.

2. Description of the Prior Art

If emitter-coupled logic (ECL) technology can be characterized by properties such as high working speed, (medium) high degree of integration and (medium) high dissipated power, then FET technology, given what are only moderate working speeds in comparison thereto, is characterized by an extremely-high degree of integration and extremely-low power dissipation. These latter properties have led to efforts to penetrate into speed ranges with integrated circuits constructed in FET technology that had been previously reserved for and only generally obtainable in bipolar technology.

For a broadband signal switching equipment having a crosspoint matrix that comprises matrix input lines respectively formed with two signal conductors, these matrix input lines being, in turn, respectively connected to two difference (complementary) outputs of an input digital signal circuit and, on the other hand, being connectible via crosspoints to matrix output lines that are likewise respectively formed with two signal conductors, the matrix output lines having their two signal conductors respectively leading to the two signal inputs of an output amplifier circuit formed with a differential amplifier, a crosspoint matrix constructed in FET technology is known in this context, as disclosed in the European application 0 264 046, corresponding to U.S. Pat. No. 4,897,645, fully incorporated herein by this reference, that is provided with pairs of switching elements each respectively formed with two switching transistors that have their respective control electrodes charged with a through-connect or, respectively, inhibit signal, a main electrode of these switching transistors being respectively connected to the one or to the other signal conductor of the appertaining matrix output line that is, in turn, provided with an output differential amplifier having a trigger behavior, whereby the pairs of switching elements respectively comprise two input transistors that respectively form a series circuit with a switching transistor, these input transistors having their respective control electrodes connected to the one or to the other signal conductor of the appertaining matrix input line and having their respective main electrodes facing away from the series circuit connected via a sampling transistor to the one terminal (ground) of the operating voltage source to whose other terminal each signal conductor of the respective matrix output line is respectively connected via a precharging transistor, and whereby precharging transistors and sampling transistors have their respective control electrodes charged oppositely to one another with a switching matrix network drive clock that subdivides a bit through-connect time interval into a precharging phase and into the actual through-connect phase, so that, given an inhibited sampling transistor, both signal conductors of the matrix output line are charged via the respective precharging transistor in each preliminary phase or precharging phase to at least approximately the potential prevailing at the other mentioned terminal of the operating voltage source.

In addition to the advantages that are involved with a crosspoint matrix constructed and kept exclusively in FET technology, this known broadband signal switching equipment yields a further advantage in that, given an inhibited crosspoint, that no disturbing signals, on the one hand, proceed via the crosspoint to the matrix output even without additional attenuation measures and in that, given a conductive crosspoint, charge reversals of the matrix output line, on the other hand, that may occur in the actual bit-through connection phase always proceed in only one charge reversal direction proceeding from the one operating potential corresponding to the one signal state and, therefore, an unambiguous change of the through-connected digital signal appearing at the output of the switching equipment from the one into the other signal state is already connected with a small charge reversal (corresponding to the upper transgression of the threshold adjacent to this value of the operating potential and corresponding to the trigger point of the differential amplifier), and, therefore, correspondingly fast.

In such a broadband signal switching equipment, a further increase in the operating speed can be enabled in that the two precharging transistors have their main electrodes facing toward the respective matrix output line connected to one another via a cross or transverse transistor whose control electrode is connected to the control electrodes of the precharging transistors (see European application 0 345 623, corresponding to U.S. Pat. No. 4,949,086, full incorporated herein by this reference). In conjunction with the advantage of speeding up the precharging of the matrix output lines, this yields a further advantage of an extremely-early balancing of the potentials of the matrix output lines, so that the starting conditions for reliable amplification by a following differential amplifier are also established correspondingly early.

The advantages which may be obtained in view of the power dissipation requirement and operating speed with such a known broadband switching equipment that comprises matrix input lines respectively formed with two signal conductors involve a corresponding space requirement for such respective two signal conductors of the matrix input lines.

In comparison thereto, another, known broadband signal switching equipment having a crosspoint matrix constructed in FET technology whose matrix input lines are connectible via crosspoints formed with respective switching elements pairs to matrix output lines respectively formed with two signal conductors at whose two signal conductors the two signal inputs of an output amplifier circuit formed with a differential amplifier having a trigger behavior are connectible, whereby the pairs of switching elements are respectively formed with two switching transistors that have, respectively, their control electrodes charged with a through-connect or, respectively, inhibit signal and have their main electrodes connected to the one or, respectively, to the other signal conductors of the matrix output line and are respectively formed with two input transistors that respectively form a series circuit with a switching transistor, the input transistors having their control electrodes respectively connected to a signal conductor of the appertaining matrix input line and having their main electrodes respectively facing away from the series circuit connected to the one terminal of the operating voltage source via a sampling transistor that is individually associated with the switching element, to the matrix input line or to the matrix output line, each signal conductor of the respective matrix output line being connected via a respective precharging transistor to the other terminal of the operating voltage source, whereby precharging transistors and sampling transistors have their respective control electrodes charged oppositely relative to one another with a switching matrix network drive clock that subdivides a bit through-connect time interval into a precharging phase and into the actual through-connect phase. Therewith, given an inhibited sampling transistor, both signal conductors of the matrix output line are charged via the respective precharging transistor in each preliminary phase to at least approximately the potential prevailing at the said other terminal of the operating voltage source, and whereby the two precharging transistors have their main electrodes facing toward the respective matrix output line connected to one another via a cross or transverse transistor whose control electrode is connected to the control electrodes of the precharging transistors.

This structure has a lower space requirement in that the pairs of switching elements each respectively comprise two input transistors of different channel type that have their control electrodes connected to one and the same signal conductor of the appertaining matrix input line, as disclosed in the German patent application 39 09 550, corresponding to the U.S. Patent application Ser. No. 497,323, filed Mar. 22, 1990 and fully incorporated herein by this reference.

Given a correspondingly-reduced space requirement, such a known broadband signal switching equipment requires only a single signal conductor per matrix input line, but simultaneously preserves the other special characteristics and advantageous properties of the initially-mentioned, known broadband signal switching equipment.

SUMMARY OF THE INVENTION

It is an object of the present invention to provide another manner for reducing the space requirement in a broadband signal switching equipment.

The present invention is directed to a broadband signal switching equipment comprising a crosspoint matrix constructed in FET technology whose matrix input lines are connectible via crosspoints respectively formed with pairs of switching elements to matrix output lines respectively formed with two signal conductors at whose two signal conductors the two signal inputs of an output amplifier circuit formed with a differential amplifier having a trigger behavior are connectible, whereby the pairs of switching elements are each respectively formed with two switching trasistors that have their respective control electrodes charged with a through-connect or, respectively, inhibit signal and have their main electrodes connected to the one or, respectively, the other signal conductor of the appertaining matrix output line and each respectively formed with two input transistors that respectively form a series circuit with a switching transistor, each of the input transistors having its control electrode respectively connected to a signal conductor of the appertaining matrix input line.

With this structure, the two signal conductors of the respective matrix output line are connected to the one terminal of the operating voltage source via precharging transistors that have their respective control electrodes connected to the clock signal line of a switching matrix network drive clock that subdivides a bit through-connect time interval into a precharging phase and into the actual charge reversal or, respectively, through-connect phase, so that, in each precharging phase, both signal conductors of the matrix output line are charged via the respective precharging transistor at least approximately to the potential prevailing at the said, one terminal of the operating voltage source, and whereby the two precharging transistors can have their main electrodes facing toward the respective matrix output line connected to one another via a cross or transverse transistor whose control electrode is connected to the control electrodes of the precharging transistors.

The broadband signal switching equipment is therefore characterized, according to the present invention, in that a respective logic element that has its control input connected to the clock signal line and that is driven opposite the precharging transistors is inserted into the input lines, and that the main electrodes of the two input transistors that face away from the respective series circuit are directly connected to the other terminal of the operating voltage source in the pairs of switching elements.

The present invention provides the advantage that no sampling transistor is required at the low end of the switching elements, and neither are required corresponding wiring arrangements, for separating the switching transistors from the appertaining terminal (ground) of the operating voltage source in the precharging phase, but nonetheless guaranteeing this separating function on the basis of a corresponding clocking of the matrix input lines with appropriate logic circuits in the matrix input lines inhibited in the precharging clock, in that all matrix input signal conductors have the ground potential impressed thereon in the precharging clock, resulting in an inhibit of the input transistors contained in the pairs of switching elements.

According to a further development and feature of the invention, each logic element can be followed by a driver circuit with whose assistance an inversion effected by the logic elements can also be canceled, if desired.

For connection to two signal conductors of the appertaining matrix input line, these signal conductors carrying complementary signals, it is advantageous that the pair of switching elements in a further development of the invention each respectively comprise two input transistors of the same channel type.

According to another advantageous development and feature of the invention, the pairs of switching elements can each respectively comprise two input transistors of different channel types that have their control electrodes connected to one and the same signal conductor of the appertaining matrix input line; only a single signal conductor is therefore required per matrix input line, this further reducing the space requirement.

An even more noticeable reduction in the space requirement is achieved when, in accordance with a further development and feature of the invention, the pairs of switching elements each respectively comprise two switching transistors of different channel types that each respectively form a series circuit with an input transistor of the same channel type.

In order to thereby avoid an unbalanced or asymmetrical loading of the two signal conductors of the matrix output lines and, therefore, an unbalanced or asymmetrical loading of the two inputs of a following differential amplifier as well, the broadband signal switching equipment constructed in accordance with the present invention can be further fashioned to such effect that the transistor series circuit of the one channel type is connected to the one signal conductor and the transistor series circuit of the other channel type is connected to the other signal conductor of the matrix output line only in a part of the pairs of switching elements leading to one and the same matrix output line, whereas the transistor series circuit of the other channel type is connected to the one signal conductor and the transistor series circuit of the one channel type is connected to the other signal conductor of the matrix output line in the other part of the pairs of switching elements leading to the appertaining matrix output line; this, preferably, can occur in such a fashion that pairs of switching elements connected to the signal conductors of the appertaining matrix output line in the one or, respectively, the other manner follow one another in alternation in the appertaining matrix row.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 6 is a pulse diagram illustrating signal courses or/waveforms therein.

DESCRIPTION OF THE PREFERRED EMBODIMENTS

Figure 1:
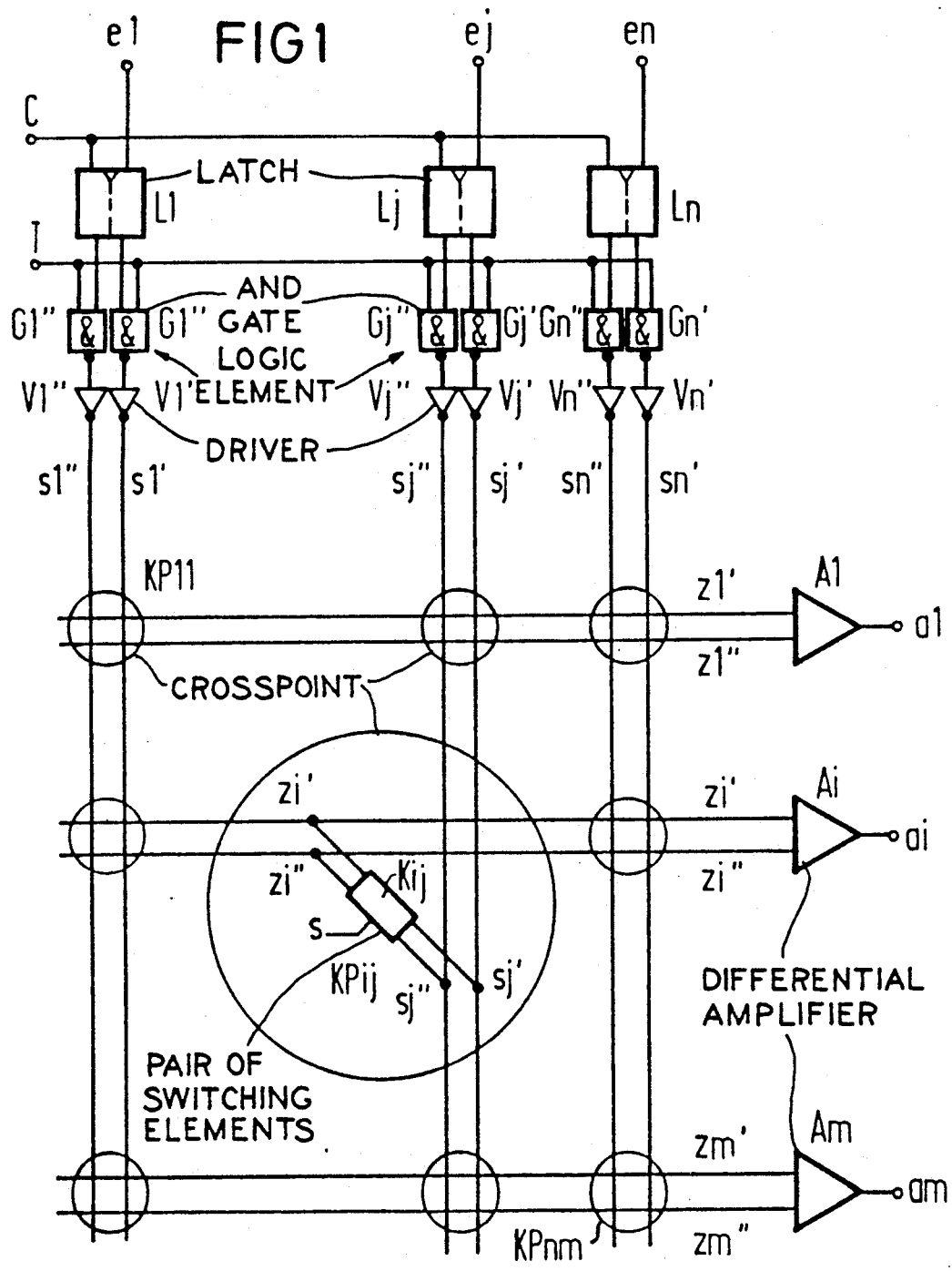
FIGS. 1 and 2 are schematic circuit diagrams of a broadband signal switching equipment constructed in accordance with the present invention.
Figure 2:
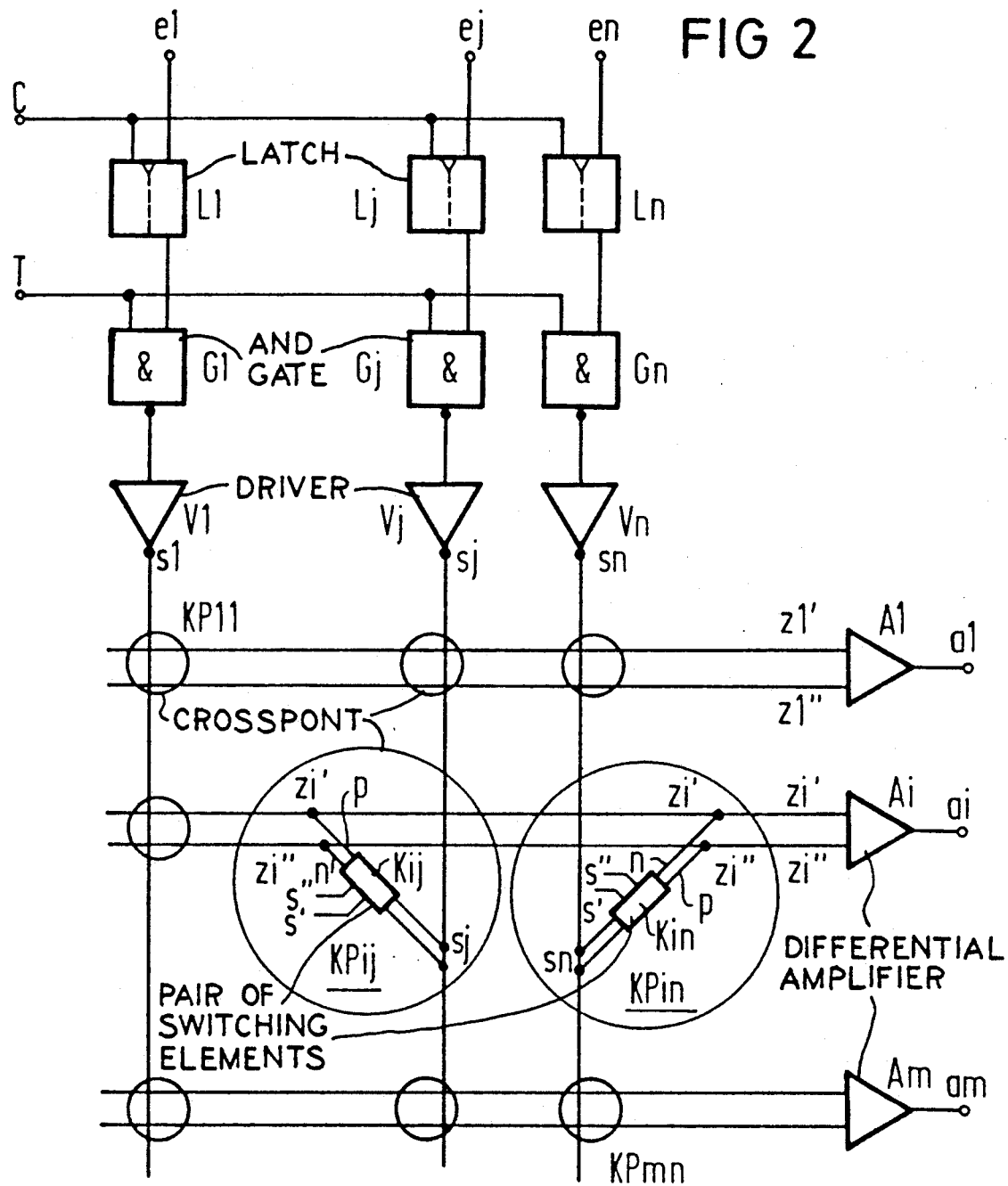

FIGS. 1 and 2 schematically illustrate a broadband signal switching equipment in a scope required for an understanding of the present invention and which comprises a plurality of input digital signal circuits which will be set forth in greater detail below provided at the inputs e1 - - - ej - - - en thereof that lead to input or column lines s1 - - - sj - - - sn of a crosspoint matrix and a plurality of outputs a1 - - - ai - - - am which are reached by a plurality of row lines or output lines z1 - - - zi - - - zm of the crosspoint matrix which are provided with respective amplifier circuits A1 - - - Ai - - - Am that can each be respectively formed with a differential amplifier having a trigger behavior.

Figure 3:
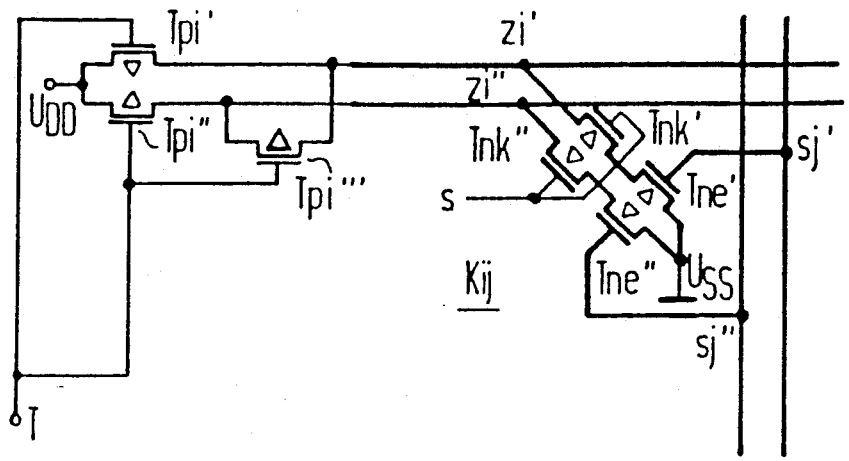
FIGS. 3, 4 and 5 are respective schematic circuit diagrams of the switching elements which may be employed in the matrices of FIGS. 1 and 2.
Figure 5:
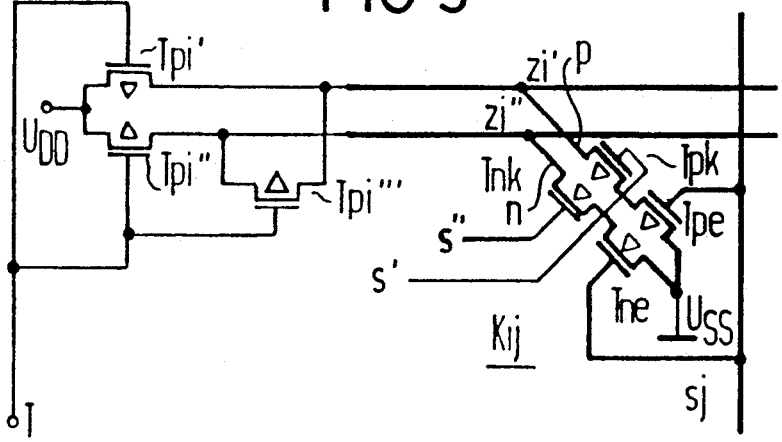

Such a differential amplifier having a trigger behavior can be realized with what is referred to as a gated flip-flop as is basically known from the publication IEEE Journal of Solid-State Circuits, October 1973, pp. 319–323, with particular reference to FIG. 6, and whereof various modifications are likewise already known from the German published application 24 22 136, FIG.3 (16'), and from the German published application 26 08 119, FIG. 5, these publications corresponding to U.S. Pat. No. 4,004,284 and U.S. patent application Ser. No. 385,484, both fully incorporated herein by this reference. whereby a balancing transistor provided therein in the first two-mentioned references, as well as precharging transistors provided therein, in the second-mentioned reference, or respectively, load transistors provided therein as in the last-mentioned reference, are to be advantageously fashioned as p-channel transistors; a further possible realization is disclosed in the above-mentioned European application 0 264 046, particularly FIG. 5 thereof.

The crosspoint matrix comprises crosspoints KP11 - - - KPij - - - KPmn whose switching elements, as indicated in greater detail at the crosspoint KPij for a pair of switching elements Kij, have their control inputs respectively driven by an address decoder of holding storage cell (not shown on the drawing, this, however, not needing to be set forth in greater detail herein since such drives of switching elements are well known in the art and appropriate explanations, moreover, can also be found elsewhere, such as in the European application 0 262 479.

Figure 4:
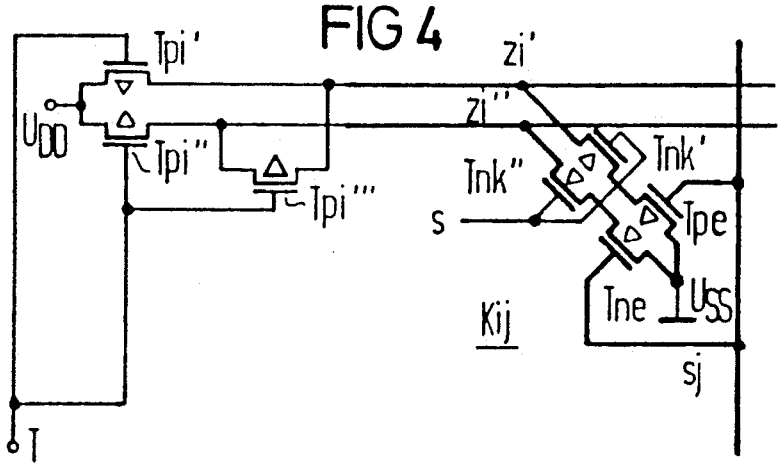

How the pairs of switching elements . . . Kij . . . can be realized in circuit-oriented terms is illustrated in FIGS. 3, 4 and 5. The pairs of switching elements . . . Kij . . . are respectively formed with two switching transistors (Tnk', Tnk" in FIGS. 3 and 4, Tpk, Tnk in FIG. 5) that have their respective control electrode charged with a through-connect or, respectively, inhibit signal and have their main electrodes connected to the one or, respectively, to the other signal conductor zi', zi" of the appertaining matrix output line and are respectively formed with two input transistors (Tne', Tne" in FIG. 3, Tpe, Tne in FIG. 4 and FIG. 5) that each respectively form a series circuit with a switching transistor and that each have their respective control electrode connected to the appertaining matrix input line (column line) . . . sj . . .

As FIGS. 1 and 3 illustrate, the matrix input lines (column lines) can thereby comprise two signal conductors (sj' and sj") that carry complementary signals, whereby, according to FIG. 3, the one input transistor Tne' then has its control electrode connected to the one signal conductor sj' and the other input transistor Tne" of the same channel type has its control electrode connected to the other signal conductor sj". As FIGS. 4 and 5 illustrate in combination with FIG. 2, two input transistors Tpe, Tne of different channel types can also be provided, these each having the respective control electrode connected to the signal conductor sj (the only signal conductor in this case) of the appertaining matrix input line (column line). According to FIG. 5, the two switching transistors Tpk and Tnk can thereby likewise be of different channel types, so that a switching transistor Tpk (or, respectively, Tnk) and an input transistor Tpe (or, respectively, Tne) of the same channel type then respectively form a series circuit.

The input transistors have their main electrodes facing away from the series circuit directly connected to the one terminal $U_{SS}$ (ground) of the operating voltage source. The two signal conductors zi', zi" of the respective matrix output line (row line) . . . zi . . . are then each respectively connected via a precharging transistor Tpi' or, respectively, Tpi" to the other terminal $U_{DD}$ of the operating voltage source. It is assumed that the two precharging transistors Tpi', Tpi" have their main electrodes facing toward the respective matrix output line (zi', zi'') connected to one another via a shunt transistor Tpi'''' whose control electrode, just like the control electrodes of the precharging transistors Tpi', Tpi'', are connected to a precharge-charge reversal clock signal line T of a switching matrix network drive clock that, as shall be set forth in greater detail below, subdivides a bit through-connect time interval into a precharging phase and into the actual charge reversal or, respectively, through-connect phase.

Turning again to FIGS. 1 and 2, in the broadband signal switching equipment illustrated thereon, the input digital signal circuit provided at the inputs e1 ... ej ... en thereof each respectively comprise a latch L1, ..., Lj, ..., Ln that is clock controlled proceeding from a clock line C; a logic circuit G1', G1'', ..., Gj', Gj'', ..., Gn', Gn'' (in FIG. 1) or, respectively, G1, ... Gj, ... Gn (in FIG. 2) that has its control input connected to the aforementioned precharging-charge reversal clock signal line T is then respectively inserted into the matrix input line following the latch L, this logic circuit being driven opposite the precharging transistors Tpi', Tpi'' (in FIGS. 3-5) by the clock signal. Given matrix input lines that comprise two signal conductors, as likewise follows from FIG. 1, each such logic element comprises two gates of which one gate is inserted into one signal conductor and the other gate is inserted into the other signal conductor; given matrix input lines having only one (single) signal conductor, as may be seen from FIG. 2: each such logic element comprises only one gate. As may be seen from FIG. 2, each gate can be formed, for example, by a NAND element (G1', G1'', ..., Gj', Gj'', ..., Gn', Gn'' in FIG. 1; G1, ..., Gj, ..., Gn in FIG. 2, whereby each NAND gate can be followed by a driver circuit V1', V1'', ..., Vj, Vj'', ..., Vn', Vn'' (in FIG. 1) or, respectively, V1, ... Vj, ..., Vn (in FIG. 2) that is likewise inverting in the present example and thus cancels the signal inversion caused by the NAND gate.

As likewise indicated in FIG. 5, the switching transistor Tnk and the input transistor Tne of the one series circuit Tne-Tnk in the crosspoint matrix constructed in complementary-metal-oxide-semiconductor (CMOS) technology can be n-channel transistors, whereas the switching transistor Tpk and the input transistor Tpe of the other series circuit Tpe-Tpk, just as the precharging transistors Tpi, are p-channel transistors.

Since p-channel transistors (given the same current yield) must be designed twice as broad as n-channel transistors, it is expedient, for avoiding asymmetrical loads of the two signal conductors zi', zi'' of a matrix output line resulting therefrom, in the realization of the pairs of switching elements to be seen from FIG. 5 having, respectively, two transistor series circuits of different channel types, that the transistor series circuit (Tpe, Tpk) of the one channel type is connected to the one signal conductor (zi') and the transistor series circuit (Tne, Tnk) of the other channel type is connected to the other signal conductor (zi'') of the matrix output line in only one portion of the pairs of the switching elements leading to one and the same matrix output line, whereas the transistor series circuit (Tne, Tnk) of the other channel type is connected to the mentioned one signal conductor (zi') and the transistor series circuit (Tpe, Tpk) of the mentioned one channel type is connected to the other signal conductor (zi'') of the matrix output line in the other portion of the pairs of switching elements leading to the appertaining matrix output line; preferably, the pairs of switching elements connected in the one or the other way to the signal conductors of the appertaining matrix output line can follow one another in alternation in the appertaining matrix row.

Such pairs of switching elements following one another in succession are indicated in FIG. 2. At the crosspoint KPij, the output p of the p-channel transistor series circuit (Tpe-Tpk in FIG. 5) is connected to the one signal conductor zi' of the appertaining matrix output line and the output n of the n-channel transistor series circuit (Tne-Tnk in FIG. 5) is connected to the other signal conductor zi''. It is then indicated in FIG. 2 that the other crosspoints lying at the matrix input line sj are connected in a corresponding fashion to the remaining matrix output lines. It is simultaneously indicated in FIG. 2 that, in the case of the crosspoints lying at the matrix input line sn, the switching element outputs are connected to the two signal conductors of the respective matrix output line in the opposite manner. As shown in greater detail in FIG. 2 for the crosspoint Kpin, in this matrix column the output n (also see FIG. 5) of the n-channel transistor series circuit of the respective pair of switching elements (for example Kin) is connected to the one signal conductor (zi' in FIG. 2) in this matrix column, whereas the output p (also see FIG. 5) of the p-channel transistor series circuit of the respective pair of switching elements (for example, Kin) is connected to the other signal conductor (zi'' in FIG. 2) of the respective matrix output line). In a corresponding manner, switching elements of all crosspoints of different matrix input lines s1-sn (in FIG. 2) leading to one and the same matrix output line (for example, zi', zi'') can have their n-channel branch connected to the one signal conductor (zi') and to the other signal conductor (zi'') of the appertaining matrix output line in alternation from matrix column-to-matrix column and have their p-channel branch connected in alternation to this other signal conductor (zi'') and to the aforementioned, one signal conductor (zi') of the appertaining matrix output line.

During the precharging phase pv (see FIG. 6, bottom), the two signal conductors (zi', zi'') of the matrix output lines (row lines) ... zi ... are respectively charged via the respective precharging transistor (Tpi' or, respectively, Tpi'' in FIGS. 3-5) to at least approximately the $U_{DD}$ operating potential, to which end the precharging transistors Tpi', Tpi'' formed by p-channel transistors in the present example are activated by a "low" clock signal T (see FIG. 6, line t).

With the trailing edge of the clock signal T, the shunt transistors Tpi''' lying between the two signal conductors zi', zi'' thereby also becomes conductive, with the result of a short circuit of the two signal conductors zi', zi'' on the basis whereof a balancing of potential of the two signal conductors zi', zi'' initially arises, on the one hand, very rapidly (time t1 in FIG. 6, line zi) after both signal conductors zi', zi'' balanced regarding their potentials, are charged via the two precharging transistors Tpi', Tpi'' to the operating potential $U_{DD}$ whereby the charging duration is shortened overall in that both precharging transistors Tpi', Tpi'' are involved in the charging event after the balancing of the potential produced by the shunt transistor Tpi'''.

At the same time as the unlatching of the precharging transistors Tpi', Tpi'' and of the shunt transistor Tpi''' by the "low" clock signal T, the gates G1', G1'', ..., Gj', Gj'', ..., Gn', Gn'' (in FIG. 1) or, respectively, G1, ..., Gj, ..., Gn (in FIG. 2) that are inserted into the signal conductors s1', s1'', ..., sj', sj'', ..., sn', sn'' (in FIG. 1) or, respectively, s1, ..., sj, ..., sn (in FIG. 2) of the input line according to FIGS. 1 and 2 are driven in the opposite sense in this example by the same "low" clock signal T, so that the operating potential $U_{SS}$ (ground) prevails at their outputs (or, respectively, at the output of a following driver circuit ... Vj ... that cancels an inversion effected by the gate ... Gj ... ) and, therefore, prevails on the appertaining signal conductor ... sj ... of the appertaining matrix input line. This results in that the input transistors Tne', Tne" (FIG. 3) or, respectively, Tne, Tpe (FIGS. 4 and 5) of all pairs of switching elements ... Kij ... are inhibited, so that the charging of the respective two signal conductors (zi', zi") of the matrix output lines (row lines) . .. zi ... can proceed independently of the drive of the respective switching transistors Tnk', Tnk" (FIGS. 3 and 4) or, respectively, Tpk, Tnk (FIG. 5) of the individual pairs of switching elements ... Kij ... The potential that corresponds to the bit to be connected through may thereby already be built up (or, respectively, maintained) on the respective matrix input line (column line) ... sj ..., as illustrated in line sj of FIG. 6.

Given equality of potential of the two signal conductors zi', zi" produced by the shunt transistor Tpi''', the initial conditions for reliable amplification by the differential amplifier Ai (FIGS. 1 and 2) are established correspondingly early, so that the charge reversal or, respectively, through-connect phase ph (see FIG. 6, bottom) following thereupon can already begin at a correspondingly early time. In this charge-reversal phase ph, the precharging transistors Tpi', Tpi" and the shunt transistor Tpi''' (FIGS. 3–5) are inhibited in the present example by a "high" clock signal T (see FIG. 6, line t) and, at the same time, the gates that are inserted into the signal conductors of the matrix input lines are, so to speak, unlatched, so that the output signal of the respective latch L1, ..., Lj, ..., Ln (FIGS. 1 and 2) respectively appears on the appertaining signal conductor s1', s1'', ..., sj', sj , ..., sn', sn'' (in FIGS. 1 and 3) or, respectively, s1, ..., sj, ..., sn (in FIGS. 2 and 4 and in FIG. 5). Here, let the respective latch ... Lj ... thereby be controlled with a clock signal as indicated in line C of FIG. 6 proceeding from the clock line C (FIG. 1). When the switching transistors Tnk', Tnk" (FIGS. 3 and 4) or, respectively, Tpk, Tnk (FIG. 5) of a switching element pair ... Kij ... are conductive as a result of a through-connect signal ("high" in the present example, see FIG. 6, line s) that is applied at the control input s (FIGS. 3 and 4) or, respectively, as a result of a through-connect signal ("low" in the present example) applied at the control input s' (FIG. 5) and as a result of a through-connect signal ("high" in the present example, FIG. 6, line s) applied at the control input s" (FIG. 5) and when the crosspoint is thus in the through-connect condition, then, dependent on the signal status corresponding to the bit to be connected through and prevailing on the appertaining matrix input line (column line) ... sj ..., the signal conductors zi', zi" of the matrix output line (row line) ... zi ... connected via the appertaining switching element ... Kij ... are discharged or, respectively, remain at the potential $U_{DD}$ assumed in the preliminary phase pv.

When the "low" signal state prevails on the (single) signal conductor of the appertaining matrix input line (column line) sj (FIG. 2, FIG. 4 and FIG. 5) and when, accordingly, the n-channel input transistor Tne (FIGS. 4 and 5) of the appertaining pair of switching elements Kij is inhibited, then the appertaining signal conductor zi" of the matrix output line (row line) zi is not discharged via the appertaining switching element of this pair of switching elements Kij but, insofar as no other crosspoint leading to this matrix output line (row line) zi is in the through-connect condition, it retains the $U_{DD}$ potential state. Simultaneously, the input transistor Tpe (FIGS. 4 and 5) of the pair of switching elements Kij under consideration, just as the switching transistor Tpk is conductive, so that the allocated signal conductor zi' of the matrix output line (row line) zi is discharged via this switching element of the pair of switching elements Kij and is drawn onto the potential $U_{SS}$.

When, by contrast, the "high" signal state prevails on the signal conductor of the matrix input line sj (FIGS. 2, 4 and 5) now under consideration and, accordingly, the n-channel input transistor Tne (FIGS. 4 and 5) of the appertaining pair of switching elements Kij is conductive, then the appertaining signal conductor zi" of the matrix output line (row line) zi is discharged via the appertaining switching element of this pair of switching elements Kij and is drawn onto the potential $U_{SS}$.

Simultaneously, the input transistor Tpe (FIGS. 4 and 5) of the pair of switching elements Kij now under consideration is nonconductive, so that the allocated signal conductor zi' of the matrix output line (row line) is not discharged via this switching element of the pair of switching elements Kij but, insofar as no other crosspoint leading to this matrix output line (row line) zi is in the through-connect condition, retains the $U_{DD}$ potential state.

When the "low" signal state prevails on the one signal conductor sj' (FIGS. 1 and 3) of a matrix input line (column line) comprising two signal conductors sj', sj" (FIGS. 1 and 3) and, accordingly, the n-channel input transistor Tne' (FIG. 3) of the appertaining signal of the appertaining pair of switching elements Kij is inhibited, then the appertaining signal conductor zi' of the matrix output line (row line) zi is not discharged via the appertaining switching element of this pair of switching elements Kij but, insofar as no other crosspoint leading to this matrix output line (row line) zi is in the through-connect condition, retains the $U_{DD}$ potential state.

The "high" signal state simultaneously prevails on the other signal conductor sj" (FIGS. 1 and 3), so that the input transistor Tne" (FIG. 3) of the pair of switching elements Kij under consideration is conductive simultaneously with the switching transistor Tnk", resulting therein that the allocated signal conductors zi" of the matrix output line (row line) zi is discharged via this switching element of the pair of switching elements Kij and is drawn onto the $U_{SS}$ potential.

When, conversely, the "high" signal state prevails on the signal conductor sj' (FIGS. 1 and 3) of the matrix input line now under consideration and, accordingly, the n-channel input transistor Tne' (FIG. 3) of the appertaining pair of switching elements Kij is conductive simultaneously with the switching transistor Tnk', then the appertaining signal conductor zi' of the matrix output line (row line) zi is discharged via the appertaining switching element of this pair of switching elements Kij and is drawn onto the $U_{SS}$ potential.

The "low" signal state then simultaneously prevails on the other signal conductor sj" (FIGS. 1 and 3), so that the input transistor Tne" (FIG. 3) of the pair of switching elements Kij under consideration is nonconductive, this resulting in the fact that the allocated signal conductor zi" of the matrix output line (row line) is not discharged via this switching element of the pair of switching elements Kij but, insofar as no other crosspoint leading to this matrix output line (row line) zi is in the through-connect condition, retains the $U_{DD}$ potential condition.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Broadband signal switching equipment comprising:
   first and second terminals of an operating voltage source carrying first and second potentials, respectively;
   a clock line for carrying clock pulses which define a precharge phase and a through-connect phase;
   a crosspoint matrix comprising said first and second terminals, said clock line, a plurality of matrix input lines, a plurality of matrix output lines, each of said matrix output lines including first and second conductors, and a plurality of crosspoints interconnecting respective matrix input lines and matrix output lines;
   a plurality of output amplifiers each including a differential amplifier comprising a trigger behavior, a first input connected to said first conductor of a respective matrix output line, a second input connected to said second conductor of the respective matrix output line, and an output;
   each of said crosspoints comprising first and second switching transistors and first and second input transistors, each of said switching and input transistors comprising first and second main electrodes, and a control electrode;
   said control electrode of said input transistors connected to the respective matrix input line;
   said control electrode of said switching transistors connected to receive through-connect and inhibit control signals;
   said first main electrodes of said first switching and first input transistors connected together to form a first series circuit;
   said first main electrodes of said second switching and second input transistors connected together to form a second series circuit;
   a plurality of pairs of precharging transistors each including a control electrode connected to said clock line for receiving clock pulses, a first main electrode connected to said first and second conductors, respectively, of a respective matrix output line, and a second main electrode connected to said first terminal of the operating voltage source, said precharging transistors operable in response to the clock pulses to connect said first and second conductors of the respective matrix output line to the first operating voltage potential so that said conductors are precharged during the precharge phase to at least approximately the first operating voltage potential;
   a plurality of shunt transistors each including a control electrode connected to said clock line, and first and second main electrodes connected to said first and second conductors of the respective matrix output line, and operable in response to clock signals to balance the charge on said first and second conductors of the respective matrix output line;
   a plurality of logic elements each including an input connected to receive input signals, an output connected to a respective matrix input line, and a control input connected to said clock line, said logic element driven by said clock signals opposite said first and second precharging transistors;
   said second main electrodes of said first and second input transistors connected to said second terminal of said operating voltage source; and
   said second main electrodes of said first and second switching transistors connected to respective ones of said first and second conductors of the respective matrix output line.

2. The broadband signal switching equipment of claim 1, and further comprising:
   a plurality of drivers each interposed between a respective logic element and the matrix input line.

3. The broadband signal switching equipment of claim 1, wherein:
   each of said matrix input lines comprises first and second conductors for carrying complementary input signals; and
   said input transistors of each crosspoint comprise transistors of the same channel type which have their control electrodes connected to respective ones of said first and second conductors of a respective matrix input line.

4. The broadband signal switching equipment of claim 1, wherein:
   said input transistors of each of said crosspoints comprise transistors of different channel types which have their control electrodes connected to the same respective matrix input line.

5. The broadband signal switching equipment of claim 1, wherein:
   input and switching transistors of said first series circuit are of a first channel type and said input and switching transistors of said second series circuit are of a second, opposite channel type.

6. Broadband signal switching equipment comprising:
   first and second terminals of an operating voltage source carrying first and second potentials, respectively;
   a clock line for carrying clock pulses which define a precharge phase and a through-connect phase;
   a crosspoint matrix comprising said first and second terminals, said clock line, a plurality of matrix input lines as column lines, a plurality of matrix output lines as row lines, each of said matrix output lines including first and second conductors, and a plurality of crosspoints interconnecting respective matrix input lines and matrix output lines;
   a plurality of output amplifiers each including a differential amplifier comprising a trigger behavior, a first input connected to said first conductor of a respective matrix output line, a second input connected to said second conductor of the respective matrix output line, and an output;
   each of said crosspoints comprising first and second switching transistors and first and second input transistors, each of said switching and input transistors comprising first and second main electrodes, and a control electrode;
   said control electrode of said input transistors connected to the respective matrix input line;

said control electrodes of said switching transistors connected to receive through-connect and inhibit control signals;

said first main electrodes of said first switching and first input transistors connected together to form a first series circuit;

said first main electrodes of said second switching and second input transistors connected together to form a second series circuit;

a plurality of pairs of precharging transistors each including a control electrode connected to said clock line for receiving clock pulses, a first main electrode connected to said first and second conductors, respectively, of a respective matrix output line, and a second main electrode connected to said first terminal of the operating voltage source, said precharging transistors operable in response to the clock pulses to connect said first and second conductors of the respective matrix output line to the first operating voltage potential so that said conductors are precharged during the precharge phase to at least approximately the first operating voltage potential;

a plurality of shunt transistors each including a control electrode connected to said clock line, and first and second main electrodes connected to said first and second conductors of the respective matrix output line, and operable in response to clock signals to balance the charge on said first and second conductors of the respective matrix output line;

a plurality of logic elements each including an input connected to receive input signals, an output connected to a respective matrix input line, and a control input connected to said clock line, said logic element driven by said clock signals opposite said first and second precharging transistors;

said second main electrodes of said first and second input transistors connected to said second terminal of said operating voltage source; and said second main electrodes of said switching transistors connected to respective ones of said first and second conductors of a respective output line in a alternation pattern for each row such that said second main electrode of said first switching transistor of alternate ones of said crosspoints of a row is connected to said first conductor and said second main electrode of said first switching transistor of an adjacent crosspoint is connected to said second conductor of the same matrix output line.

7. The broadband signal switching equipment of claim 6, wherein:

said first switching transistor and said first input transistor of each of said crosspoints are of a first conductivity type; and said second switching transistor and said second input transistor of each of said crosspoints are of a second conductivity type.

8. Broadband signal switching equipment comprising:

first and second terminals of an operating voltage source carrying first and second potentials, respectively;

a clock line for carrying clock pulses which define a precharge phase and a through-connect phase;

a crosspoint matrix comprising said first and second terminals, said clock line, a plurality of matrix input lines as column lines, a plurality of matrix output lines as row lines, each of said matrix output lines including first and second conductors, and a plurality of crosspoints interconnecting respective matrix input lines and matrix output lines;

a plurality of output amplifiers each including a differential amplifier comprising a trigger behavior, a first input connected to said first conductor of a respective matrix output line, a second input connected to said second conductor of the respective matrix output line, and an output;

each of said crosspoints comprising first and second switching transistors and first and second input transistors, each of said switching and input transistors comprising first and second main electrodes, and a control electrode;

said control electrode of said input transistors connected to the respective matrix input line;

said control electrodes of said switching transistors connected to receive through-connect and inhibit control signals;

said first main electrodes of said first switching and first input transistors connected together to form a first series circuit;

said first main electrodes of said second switching and second input transistors connected together to form a second series circuit;

a plurality of pairs of precharging transistors each including a control electrode connected to said clock line for receiving clock pulses, a first main electrode connected to said first and second conductors, respectively, of a respective matrix output line, and a second main electrode connected to said first terminal of the operating voltage source, said precharging transistors operable in response to the clock pulses to connect said first and second conductors of the respective matrix output line to the first operating voltage potential so that said conductors are precharged during the precharge phase to at least approximately the first operating voltage potential;

a plurality of shunt transistors each including a control electrode connected to said clock line, and first and second main electrodes connected to said first and second conductors of the respective matrix output line, and operable in response to clock signals to balance the charge on said first and second conductors of the respective matrix output line;

a plurality of logic elements each including an input connected to receive input signals, an output connected to a respective matrix input line, and a control input connected to said clock line, said logic element driven by said clock signals opposite said first and second precharging transistors;

said second main electrodes of said first and second input transistors connected to said second terminal of said operating voltage source; and said second main electrodes of said switching transistors connected to respective ones of said first and second conductors of a respective output line for each row such that said second main electrode of said first switching transistor of a first portion of said crosspoints of a row is connected to said first conductor and said second main electrode of said first switching transistor of a second portion of said crosspoints is connected to said first conductor of the same matrix output line.

9. The broadband signal switching equipment of claim 6, wherein:

said first switching transistor and said first input transistor of each of said crosspoints are of a first conductivity type; and said second switching transistor and said second input transistor of each of said crosspoints are of a second conductivity type.

10. Broadband signal switching equipment comprising:

first and second terminals of an operating voltage source carrying first and second potentials, respectively;

a clock line for carrying clock pulses which define a precharge phase and a through-connect phase;

a crosspoint matrix comprising said first and second terminals, said clock line, a plurality of matrix input lines, a plurality of matrix output lines, each of said matrix output lines including first and second conductors, and a plurality of crosspoints interconnecting respective matrix input lines and matrix output lines;

a plurality of output amplifiers each including a first input connected to said first conductor of a respective matrix output line, a second input connected to said second conductor of the respective matrix output line, and an output;

each of said crosspoints comprising first and second switching transistors and first and second input transistors, each of said switching and input transistors comprising first and second main electrodes, and a control electrode;

said control electrode of said input transistors connected to the respective matrix input line;

said control electrodes of said switching transistors connected to receive through-connect and inhibit control signals;

said first main electrodes of said first switching and first input transistors connected together to form a first series circuit;

said first main electrodes of said second switching and second input transistors connected together to form a second series circuit;

a plurality of pairs of precharging transistors each including a control electrode connected to said clock line for receiving clock pulses, a first main electrode connected to said first and second conductors, respectively, of a respective matrix output line, and a second main electrode connected to said first terminal of the operating voltage source, said precharging transistors operable in response to the clock pulses to connect said first and second conductors of the respective matrix output line to the first operating voltage potential so that said conductors are precharged during the precharge phase to at least approximately the first operating voltage potential;

a plurality of logic elements each including an input connected to receive input signals, an output connected to a respective matrix input line, and a control input connected to said clock line, said logic element driven by said clock signals opposite said first and second precharging transistors;

said second main electrodes of said first and second input transistors connected to said second terminal of said operating voltage source; and said second main electrodes of said first and second switching transistors connected to respective ones of said first and second conductors of the respective matrix output line.

11. The broadband signal switching equipment of claim 10, and further comprising:

a plurality of shunt transistors each including a control electrode connected to said clock line, and first and second main electrodes connected to said first and second conductors of the respective matrix output line, and operable in response to clock signals to balance the charge on said first and second conductors of the respective matrix output line.

12. The broadband signal switching equipment of claim 10, wherein:

each of said output amplifiers comprises a differential amplifier having a trigger behavior.

13. Broadband signal switching equipment comprising:

first and second terminals of an operating voltage source carrying first and second potentials, respectively;

a clock line for carrying clock pulses which define a precharge phase and a through-connect phase;

a crosspoint matrix comprising said first and second terminals, said clock line, a plurality of matrix input lines as column lines, a plurality of matrix output lines as row lines, each of said matrix output lines including first and second conductors, and a plurality of crosspoints interconnecting respective matrix input lines and matrix output lines;

a plurality of output amplifiers each including a first input connected to said first conductor of a respective matrix output line, a second input connected to said second conductor of the respective matrix output line, and an output;

each of said crosspoints comprising first and second switching transistors and first and second input transistors, each of said switching and input transistors comprising first and second main electrodes, and a control electrode;

said control electrode of said input transistors connected to the respective matrix input line;

said control electrodes of said switching transistors connected to receive through-connect and inhibit control signals;

said first main electrodes of said first switching and first input transistors connected together to form a first series circuit;

said first main electrodes of said second switching and second input transistors connected together to form a second series circuit;

a plurality of pairs of precharging transistors each including a control electrode connected to said clock line for receiving clock pulses, a first main electrode connected to said first and second conductors, respectively, of a respective matrix output line, and a second main electrode connected to said first terminal of the operating voltage source, said precharging transistors operable in response to the clock pulses to connect said first and second conductors of the respective matrix output line to the first operating voltage potential so that said conductors are precharged during the precharge phase to at least approximately the first operating voltage potential;

a plurality of logic elements each including an input connected to receive input signals, an output connected to a respective matrix input line, and a control input connected to said clock line, said logic element driven by said clock signals opposite said first and second precharging transistors;

said second main electrodes of said first and second input transistors connected to said second terminal of said operating voltage source; and said second main electrodes of said switching transistors connected to respective ones of said first and second conductors of a respective output line in a alternation pattern for each row such that said second main electrode of said first switching transistor of alternate ones of said crosspoints of a row is connected to said first conductor and said second main electrode of said first switching transistor of an adjacent crosspoint is connected to said second conductor of the same matrix output line.

14. The broadband signal switching equipment of claim 13, and further comprising:
a plurality of shunt transistors each including a control electrode connected to said clock line, and first and second main electrodes connected to said first and second conductors of the respective matrix output line, and operable in response to clock signals to balance the charge on said first and second conductors of the respective matrix output line.

15. The broadband signal switching equipment of claim 13, wherein:
each of said output amplifiers comprises a differential amplifier having a trigger behavior.

16. Broadband signal switching equipment comprising:
first and second terminals of an operating voltage source carrying first and second potentials, respectively;
a clock line for carrying clock pulses which define a precharge phase and a through-connect phase;
a crosspoint matrix comprising said first and second terminals, said clock line, a plurality of matrix input lines as column lines, a plurality of matrix output lines as row lines, each of said matrix output lines including first and second conductors, and a plurality of crosspoints interconnecting respective matrix input lines and matrix output lines;
a plurality of output amplifiers each including a first input connected to said first conductor of a respective matrix output line, a second input connected to said second conductor of the respective matrix output line, and an output;
each of said crosspoints comprising first and second switching transistors and first and second input transistors, each of said switching and input transistors comprising first and second main electrodes, and a control electrode;
said control electrode of said input transistors connected to the respective matrix input line;

said control electrodes of said switching transistors connected to receive through-connect and inhibit control signals;
said first main electrodes of said first switching and first input transistors connected together to form a first series circuit;
said first main electrodes of said second switching and second input transistors connected together to form a second series circuit;
a plurality of pairs of precharging transistors each including a control electrode connected to said clock line for receiving clock pulses, a first main electrode connected to said first and second conductors, respectively, of a respective matrix output line, and a second main electrode connected to said first terminal of the operating voltage source, said precharging transistors operable in response to the clock pulses to connect said first and second conductors of the respective matrix output line to the first operating voltage potential so that said conductors are precharged during the precharge phase to at least approximately the first operating voltage potential;
a plurality of logic elements each including an input connected to receive input signals, an output connected to a respective matrix input line, and a control input connected to said clock line, said logic element driven by said clock signals opposite said first and second precharging transistors;
said second main electrodes of said first and second input transistors connected to said second terminal of said operating voltage source; and
said second main electrodes of said switching transistors connected to respective ones of said first and second conductors of a respective output line for each row such that said second main electrode of said first switching transistor of a first portion of said crosspoints of a row is connected to said first conductor and said second main electrode of said first switching transistor of a second portion of said crosspoints is connected to said first conductor of the same matrix output line.

17. The broadband signal switching equipment of claim 16, and further comprising:
a plurality of shunt transistors each including a control electrode connected to said clock line, and first and second main electrodes connected to said first and second conductors of the respective matrix output line, and operable in response to clock signals to balance the charge on said first and second conductors of the respective matrix output line.

18. The broadband signal switching equipment of claim 16, wherein:
each of said output amplifiers comprises a differential amplifier having a trigger behavior.

* * * * *